United States Patent [19]

Mansolillo

[11] 4,278,483

[45] Jul. 14, 1981

[54] PROCESS FOR PRODUCING DECORATIVE SURFACE COVERING

[75] Inventor: Robert D. Mansolillo, Bloomfield, N.J.

[73] Assignee: Congoleum Corporation, Kearny, N.J.

[21] Appl. No.: 71,454

[22] Filed: Aug. 31, 1979

[51] Int. Cl.[3] .......................... B32B 31/26; B32B 5/20

[52] U.S. Cl. .......................................... 156/79; 156/77; 156/85; 156/155; 156/277; 427/195; 427/197; 427/201; 427/203; 428/207; 428/215

[58] Field of Search ..................... 156/62.2, 76, 77, 78, 156/84, 277, 85, 155, 79; 427/195, 197, 201, 202, 203; 428/207, 215; 106/20

[56] References Cited

U.S. PATENT DOCUMENTS

| | | | |
|---|---|---|---|
| 2,987,102 | 6/1961 | Heinrichs .............................. | 428/204 |
| 3,343,975 | 9/1967 | Daneski et al. .................. | 156/277 X |
| 3,359,352 | 12/1967 | Powell et al. ...................... | 156/77 X |

*Primary Examiner*—John T. Goolkasian
*Assistant Examiner*—Robert A. Dawson
*Attorney, Agent, or Firm*—Richard T. Laughlin

[57] ABSTRACT

The process for producing a decorative surface covering having an inlaid decoration which comprises depositing a layer of fine granules of resinous composition on the surface of a backing sheet, heating to sinter the granules into a porous mass, applying a design on the surface of the sintered layer with a mixture of a pigmented dryblend of at least two contrasting colors and a transparent or translucent plastisol and then fusing the printed, sintered sheet into a non-porous sheet by the application of heat.

10 Claims, 2 Drawing Figures

PROCESS FOR PRODUCING DECORATIVE SURFACE COVERING

BACKGROUND OF THE INVENTION

Figure 1:
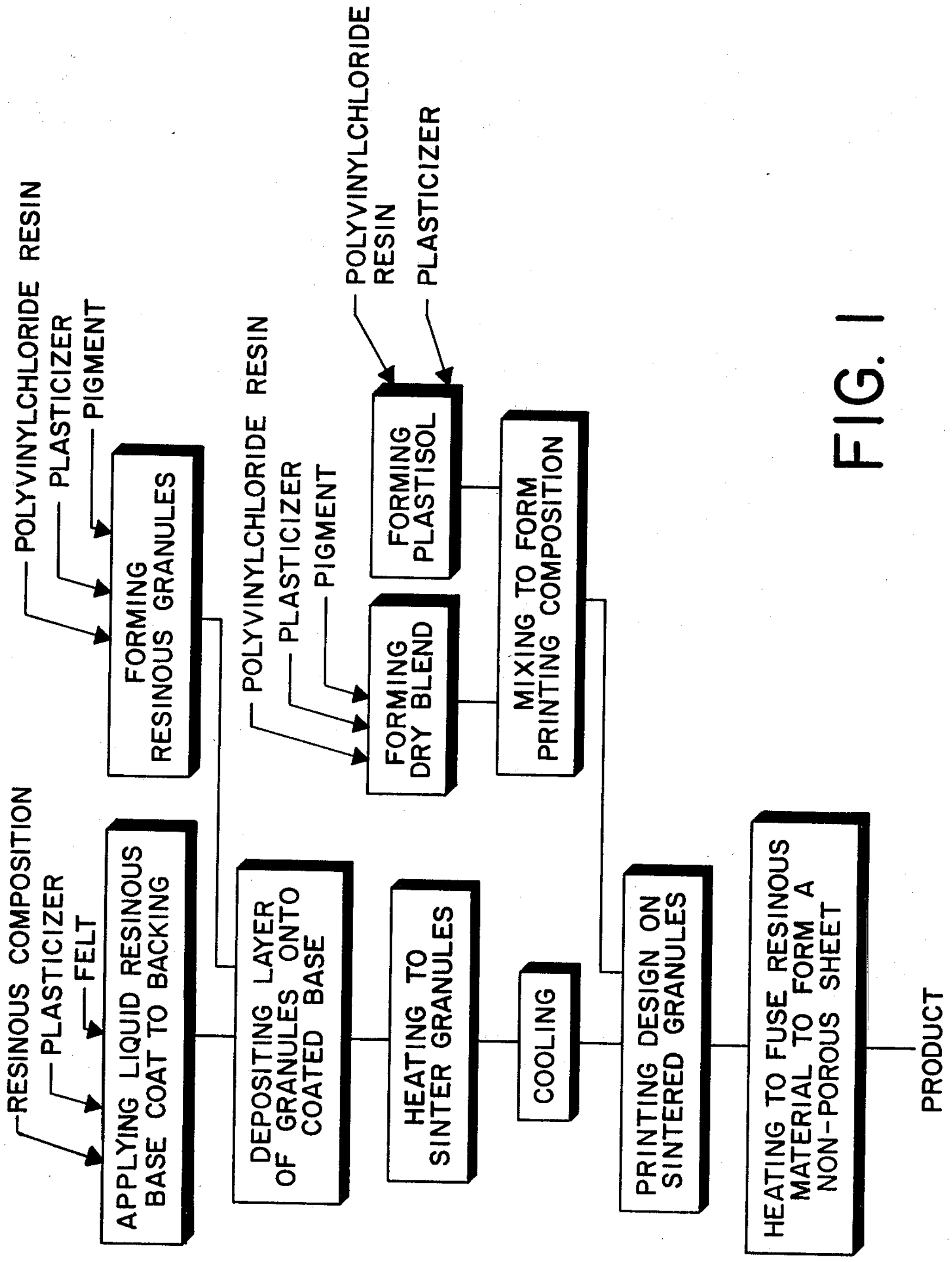

Decorative, wear-resistant sheets of resinous composition are widely used as surface coverings for a wide variety of products such as floors, walls, counter and table tops, book covers and various containers. Such surfaces can be covered by tiles cut from the sheet or by the sheet itself. In addition, these sheets can be used as fabrics for upholstery, clothing, automobile interiors and the like.

The decoration of these sheets is of great importance in increasing the products' marketability by helping the covering to adapt to a particular use. These coverings are often printed with a design that simulates such things as brick, slate, ceramic tile, wood, leather, etc., or with some other attractive pattern. The methods for producing a decoration on the product are many and varied. One simple method is to print a design with a rotogravure press on a backing and then cover the surface with a transparent resinous coating. Such printed products usually have a protective, transparent coating on the surface which is called a wearlayer. Printed products have the disadvantage that the wearability is determined by the thickness of the wearlayer and the printed design does not have the true appearance of natural occurring material such as stones.

One of the popular floorcoverings produced commercially is made by stenciling onto a base particulate fused vinyl compositions having contrasting pigmentation. The sheet is then consolidated in a large press utilizing high heat and pressure to produce a moulded inlaid product which has multi-colored design elements resulting from the utilization of the fused vinyl compositions of contrasting pigmentation. This process results in an inlaid decoration i.e. the same decoration is present throughout the service life of the product. A major disadvantage of the stencil procedure is the slow speed and extreme care that must be exercised in handling the stencils to produce a product of consistant thickness. Should the stencils be out of alignment, any overlap of different colored granules would result in an excessively thick portion of the sheet. Although both of the two procedures mentioned provide a method for producing a controlled decoration of repeating or definite design, neither produces a design that has a three-dimensional appearance.

One method for achieving a three-dimensional effect is disclosed in U.S. Pat. No. 2,987,102, which issued to A. J. Heinrichs on June 6, 1961. Here, opaque and transparent or translucent chips are blended together and formed into a smooth sheet by the application of heat and pressure, after which a pigmented backing is laminated to the underside of this sheet. As the colored backing is visible through the transparent or translucent areas of the top sheet, the design appears to be three-dimensional. This method is, however, capable of producing only a random, nongeometrical pattern.

A process for producing an inlaid decorative sheet with a geometric decoration of three-dimensional appearance is disclosed in U.S. Pat. No. 3,359,352 which issued to W. H. Powell, et al, on Dec. 19, 1967. In accordance with one of the procedures disclosed in the patent, a layer of fine granules of resinous composition commonly referred to as a dryblend is deposited on the surface of a base, and then heated to form a partial coalescence or sintering of the granules. The sintered layer is then cooled and a design is printed on the surface with a printing composition which will penetrate into the sintered composition. The printed sintered layer is then subjected to heat and, if desired, pressure to form a non-porous layer. The resulting product is a resinous composition sheet which has the printed decoration extending into the sheet. The product can be given a decorative three-dimensional appearance by utilizing transparent or translucent granules. The disadvantage of this procedure is that any given printed area is restricted to a single color, that of the printing composition there applied, and so the product does not have the appearance of having an inlaid design.

PURPOSES AND OBJECTS OF THE INVENTION

It is an object of the invention to provide a process for producing a resinous composition surface covering having an inlaid design without the utilization of massive presses and high heats in a simple, flexible process with the adoption of conventional silk-screen printing apparatus. Another object of the invention is to produce such a product having a geometric decoration. A further object is to produce such a product having a decoration with the appearance of depth. A still further object is to produce such a product having a textured surface.

SUMMARY OF THE INVENTION

In accordance with the invention, a blend containing several different colors of pigmented, fusable fine granules of resinous composition is applied to a base at a uniform thickness. The granules are then partially fused or sintered by the application of heat to form a unified, porous sheet. The heating is carefully controlled so that it is reasonably uniform throughout the thickness of the layer of granules, and no substantial pressure is applied to the granules. This assumes a uniform porosity throughout the sheet which is essential to produce the desired result. A combination of clear (transparent) or lightly tinted plastisol and dryblend of at least two contrasting colorations are mixed together to form a printing composition for the product. Resin particles of two colors or particles of many different colors can be used in a single dryblend, and several different dryblends can be used on the same product. The printing composition is applied in a design by printing on the sintered sheet using a silk screen apparatus. A separate screen is used for each different design element desired in the final product. The printed sintered sheet is then subjected to heat to form a non-porous layer. The resulting product is a resinous composition sheet with a true inlaid design as the design elements are made up of a multiplicity of particles of various colors extending into the sheet for any desired depth. Each individual screened area can be composed of a different printing composition and the overall appearance reflects a look of controlled placement of the printing composition in specific areas. The unprinted area retains the color of the sintered base and is at a lower level than the printed area. This lower level is created by applying more printing composition than is needed to fill the voids in the sintered layer in the area of design application. As a result of this height differential an embossed registered print effect is achieved. The amount of plastisol in the printing composition can be controlled to increase the product's appearance of depth.

The surface of the product can be further textured by incorporating in the granule base layer a substance which on further treatment will create voids in the layer. The type of agents which create such voids are soluble compositions which can be washed out of the sintered composition, agents which will decompose upon heating, solid plasticizers which will be absorbed into the resin granules and compounds which will shrink or contract upon heating. Creating such voids has the additional advantage of materially aiding the penetration of the printing composition. The granular layer containing the added agent is treated to create the voids. This can be accomplished simultaneously with sintering, or by a special treatment after sintering, such as washing with water or a solvent. The sintered product is then printed. The printing composition can partially or completely fill the voids. In the areas where no printing composition is applied, the voids will remain. The printed sheet is then heated which causes the resin particles to flow together and fill the voids. The surface of the resulting layer will have depressed areas which correspond in depth to the amount of voids present.

Figure 2:
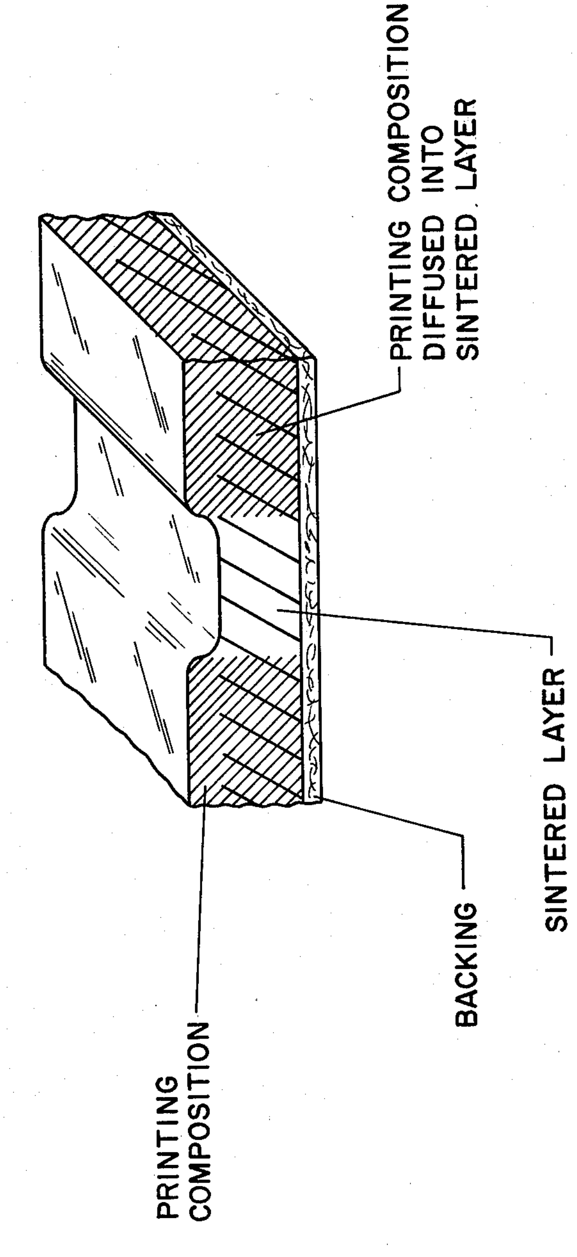

The invention will be better understood from the following detailed description thereof together with the accompanying self-explanatory drawings in which FIG. 1 is a flow diagram of a typical embodiment of the process utilized in this invention and FIG. 2 is an enlarged cross-sectional view of a typical product.

DESCRIPTION OF PREFERRED AND TYPICAL EMBODIMENTS

The backing sheet upon which the decorative sheet is formed is preferably a sheet of strong material. Strength is important in such backing material in order that the product withstand the strains occurring during manufacture and also when the product is installed. In the case of a flexible resilient product useful as floor covering, it is desirable for the backing to have sufficient flexibility to permit the product to be rolled and unrolled without cracking or tearing. Suitable backing sheets include those formed of resinous compositions as well as sheets of impregnated felted fibers. Often a fiberglass interlayer is employed in the backing sheet to provide dimensional stability. Any of the thermoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible backing sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various other synthetic, animal and mineral fibers. When utilizing such material, it is usually desirable to coat the surface with a pigmented resinous composition to hide the color of the backing, and form a good background for the printed design in the event the backing will be visible. Such a composition can also serve as an adhesive to bind the fine granules to the backing. It has been found that felted cellulose or asbestos fibrous sheets impregnated with a waterproofing and/or strengthening impregnant are highly desirable backings for products prepared in accordance with the invention since they are low in cost and yet are flexible and strong. Numerous other fibrous materials can be used. The sheet can be formed from a slurry of fibrous material in water using any of the techniques conventionally employed in the manufacture of paper. For example, sheet formulation can take place on a Fourdrinier or cylinder paper machine. The fibrous sheet so prepared is then dried. Synthetic resinous materials are particularly suitable for use as impregnants for backing sheets. Suitable resins include vinyl resins, such as polyvinyl chloride, polyvinyl acetate, polymerized vinylidene chloride, mixtures of these with each other, copolymers with each other and with other monomers copolymerizable therewith, polymerized acrylic and methacrylic acids and their polymerized derivatives, polyethylene, polystyrene, butadiene-styrene copolymer, butadieneacrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins, i.e., drying oils and the like, isocyanates and polyurethanes and the like are suitable. A particularly desirable backing sheet is disclosed and claimed in U.S. Pat. No. 2,992,963, which issued July 18, 1961, to Nagel et al.

The impregnating resins can be incorporated into the felted fibrous sheet by impregnation of the finished sheet with an emulsion or solution of the resin followed by drying of the sheet to remove the solvent. Alternatively, the resin can be added as fine particles to the fiber furnish prior to sheet formation either as solid particles of resin or as an emulsion in water from which fine particles of resin are precipitated onto the fibers.

Often it is preferred to apply a pigmented layer to the surface of the backing sheet. This pigmented layer is particularly desirable when transparent or translucent granules are utilized and the surface of the backing sheet would be visible when viewed from the surface of the product. This layer can be of any color depending on the particular design effect desired in the finished product. It has been found particularly effective from the standpoint of cost and ease of application that the pigmented layer be formed on the backing by a coating technique. The coating composition comprises a resinous binder, pigment, filler and stabilizer in a liquid dispersion medium. An aqueous system has been found particularly effective and relatively inexpensive. In the coating composition, the ratio of resinous binder to pigment and filler is usually in the range of about 1:4 to 1.5:1. The resinous binder in the coating composition must also be compatible with the composition formed upon the decorative layer as described more fully hereinafter.

The preferred resinous binder in the coating composition comprises thermoplastic resinous material. The thermoplastic resinous binder can be made up solely of thermoplastic resinous material but it normally comprises a mixture of a thermoplastic resin, plasticizer, stabilizers, pigments and the like. Useful thermoplastic resins include polymers and copolymers of acrylic and methacrylic acids and their derivatives, the vinyl resins such as polymers of vinyl chloride, styrene, methystyrene, butadiene and the like. Polymers of vinyl chloride have been found particularly effective in the formulation of coating emulsions in the invention. The vinyl polymers can either be simple, unmixed homopolymers of vinyl chloride or polymers thereof in which the essential polymeric structure of polyvinyl chloride is interspersed at intervals with the residues of other ethylenically unsaturated compounds copolymerized therewith. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthakenes, vinyl pryridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters and the like. The use of coating compositions containing thermosetting resins is usually restricted to the situation where the decorative composition formed into a sheet upon the pigmented layer is also thermosetting, the resulting final product has to be cured to convert the resins to their set state. When a thermosetting resin is used, it should be in an uncured or partially cured state in the coating composition.

The coating composition usually contains a plasticizer. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di(2-ethylhexanoate), diethylene glycol dipelargonate, dibutyl phthalate, dioctyl phthalate, dibutoxy ethyl phthalate, dipropylene glocol dibenzoate, butyl benzyl phthalate, dibenzyl sebacate, dibenzyl phthalate, tricresyl phosphate, octyl diphenyl phosphate, chlorinated paraffine, alkd derivatives or rosin and the like. The blend of resin and plasticizer is normally formed within the limits of about 15 to about 150 parts of plasticizer per 100 parts of resin with about 40 to about 100 parts plasticizer being preferred.

The coating composition also contains fillers and pigments in accordance with the particular background color desired in the finished product. Inert fillers, such as silica, both amorphous and crystalline, whiting, talc, clay, pumice, limestone and the like are suitable. Pigments are selected in accordance with the desired color. For example, where a white background is desired, titanium dioxide and zinc oxide either alone or with extenders such as barium sulfate, calcium sulfate, magnesium carbonate, magnesium silicate and the like can be used. For colored background coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

Small amounts of stabilizers, well known in the art of making polyvinyl chloride compositions, are incorporated in the coating composition to minimize the effects of degradation by light and heat. Primary stabilizers ordinarily used are metallo-organic compounds, salts or complexes containing a metal component such as cadmium, zinc, lead, tin, barium or calcium combined with an anion constituent such as octaoate, 2-ethylhexoate, naphthenate, tallate, benzoate, oxide, acetate, stearate, phenate, laurate, caprylate, phosphite, phthalate, maleate, fumarate, carbonate, sulfate, silicate, alkyl mercaptide, or mercaptoacid salts and esters. Mixtures containing one or more metals and/or one or more anion components are commonly employed. Depending upon the degree of heat and light stability required, secondary or auxiliary stabilizers such as expoxidized components, organic phosphites and phosphates, polyhydric alcohols, ultra violet light absorbers, optical brighteners, nitrogen compounds and antioxidants may also be incorporated in the resinous composition.

The use of a highly pigmented and filled emulsion of resinous binder and plasticizer is perferred but the coating composition can be applied from different types of liquid compositions. For example, thermoplastic resinous plastisol, organosol or aqueous emulsion coating systems can be used. In this case, the dispersion medium instead of being water is a plasticizer and volatile organic solvent in the case of an organosol. Since it is desired to obtain a thin dense layer which completely covers and hides the backing, a dispersion containing high percentage of pigment and filler is particularly desirable.

When using the preferred technique of coating to apply a pigmented layer to a surface of the backing, the resinous composition is applied to the backing by way of the conventional techniques well known in the coating art, such as a reverse roll coater, doctor blade coating, spray application, brush application and the like. After the coating has been applied to the backing, the sheet is usually subjected to heat in order to evaporate any volatile components and to fuse the resinous binder into a flexible uniform film. In the case of an aqueous latex emulsion coating system, the heat treatment step serves to evaporate water in the emulsion. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° F. to about 375° F. is usually sufficient to evaporate the carrier present and to yield a uniform film. A similar heat treatment step is carried out when an elastomeric resinous coating composition is applied to a surface of the backing to yield a pigmented layer thereon. Where the thermosetting resinous binders are used in the coating emulsion, the temperature to which the coating is subject must be sufficient to evaporate all the carrier in the emulsion but generally insufficient to completely cure the resin. Heating can be effected by passing the sheet through a forced hot air oven or radiant heating elements can be placed above the coated surface.

In accordance with the invention, a layer of opaque, transparent (including translucent), or a combination of opaque and transparent fine granules are distributed on the surface of the base. This layer should have a minimum thickness of 0.015 inch. These granules are preferably prepared by blending the components of the compositions in a suitable mixing apparatus. The size of the granules is important to the invention and should be about 0.40 to about 0.005 inch in their largest dimension and preferably from about 0.05 to about 0.01 inch in diameter. The best results have been obtained by utilizing as the granules a dry blend composition. This is prepared by utilizing calender grade resin which has large particle size usually of the order of about 0.003 to about 0.025 inch in diameter. The dry resin particles are mixed with plasticizer and stabilizer at a temperature of about 200° F. which is well below the normal fusion temperature of resins. The mixture is discharged from the mixer and is in the form of fine unfused granules. A minor portion of larger granules or flakes can be present to give the product added decorative appeal.

Polymers of vinyl chloride have been found to be particularly effective in formulating the granules for use in the invention. The vinyl chloride polymers can either be simple, unmixed homopolymers of vinyl chloride or polymers thereof in which the essential polymeric structure polyvinyl chloride is interspersed at intervals with the residues of other ethylenically unsaturated compounds polymerized therewith. The essential properties of the polymeric structure of polyvinyl chloride will be retained if not more than 40 percent of the extraneous comonomers are polymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; unsaturated compunds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumerate and the like; vinylidene compounds on the order of vinylidene chloride, vinylidene bromide, vinylidene fluorochloride and the like; unsaturated hydrocarbons, such as ethylene, propylene, isobutene and the like; allyl acetate, allyl chloride, allyl ethyl ether and the like; and conjugated and cross-conjugated ethylenically unsaturated compounds such as butadiene; iosprene; chloroprene; 2,3-dimethylbutadiene-1,3-piperylene; divinyl ketone and the like.

Polymers of vinyl chloride having specific viscosities above about 0.17 and preferably between about 0.17 and about 0.31 as measured in a solution of 0.2 gram of resin in 100 milliliters of nitrobenzene at 20° C. are particularly effective. In the determination of specific viscosities, the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is a unitless number but is an effective measure of relative molecular weight of the polymer, the higher the specific viscosity the higher being the molecular weight.

Although a vinyl chloride polymer is particularly effective in the compositions of the granules for use in the invention, these compositions can also be formed from other thermoplastic resins as well as rubbery elastomeric and thermosetting resins, such as disclosed above in the discussion of the coating composition. The resinous system selected for the composition of the granules should be compatible with the resin in the pigmented layer to insure maximum adhesion between the pigmented layer and the decorative wear layer. In addition, the resin selected should be capable of being formulated into a clear transparent composition, if necessary. For example, when the pigmented layer is formed of a thermosetting resinous composition, the composition of the granules should also be of the thermosetting resinous type, with the particular resin selected being compatible with the composition of the pigmented layer.

The clear transparent composition contains resinous binder and stabilizer. It is not highly pigmented and filled. Color can be imparted to the clear composition by the use of small amounts of pigment or organic dye, but the amount used must not be sufficient to impart any appreciable degree of opacity to the composition. The opaque composition also preferably contains filler in order to reduce the cost of the composition. The opaque composition can contain up to about 80 percent by weight of pigment and filler. Pigment is used in order to impart the desired color and opacity to the composition and can be any of the well-known organic or inorganic pigments widely used in the plastic surface covering industry. The opaque composition can also contain inert fillers, such as whiting, clay, talc, pumice, limestone, and the like. The size of the pores which are formed by the sintering can be influenced by a suitable selection of the size of the grains of the vinyl chloride polymer, by the amount of plasticizer or mixture of plasticizer and solvents, and the sintering temperature utilized. All of these factors will effect the depth of penetration of printing composition. The plasticizer is usually present in about 15 to about 100 parts per 100 parts of resin with about 20 to about 40 parts plasticizer being preferred.

As indicated, a substance which on further treatment will create voids in the granular layer can be mixed with the granules to increase the penetration of the printing composition and, if desired, to enhance the embossing of the product. Such additive can take many forms, although as a general rule, the size of the particles of additive should be the same range as the granules, i.e., about 0.005 to about 0.40 inch in their largest dimension and preferably from about 0.05 to about 0.01 inch. One form of additive is any water or solvent soluble crystalline compound. Such a compound would have to be soluble in a solvent which would not adversely affect the granules. Typical of such compositions are the water soluble alkali metal salts of chloride, bromides and iodides, and the like. As a general rule, the average particle size should be at least 50 microns. When utilizing compositions of this nature, the layer of granules after sintering is washed with a suitable solvent to dissolve the crystals and remove them from the sintered sheet. Agents which decompose upon heating to yield a gas have been found particularly effective. When utilizing such agents, however, it is important that the gas generated during decomposition is not entrapped in the sintered composition. Ammonium bicarbonate is a particularly effective agent of this type. Another method which is also particularly effective is the utilization of a plasticizer which is solid at lower temperatures, but, upon heating to sintering temperature, the plasticizer will be absorbed by the resin. Typical examples of such plasticizers are chlorinated polyphenyl which has a softening point between 300° to 340° F., chlorinated polyethylene, dicyclohexyl phthalate, diphenyl phthalate and triphenyl phosphate. An agent which contracts upon heating can also be used. Hollow spherical particles of resin such as styrene is a good illustration of this type of agent. The amount of such an additive can vary widely. If its addition is merely to increase porosity of the sintered granules, from about 5 to about 20% has been found particularly effective. If it is to be utilized to produce texture the amount can be substantially higher. As is apparent, it is highly desirable to have the agent mixed uniformly with the granules.

In accordance with the invention, a design is applied to the sintered granules with a dry blend plastisol mixture using a silk screen or some other suitable printing apparatus. The dry blend is composed of calender grade resin particles as disclosed above in the description of the sintered base, although the resin particles used in the printing composition may be substantially smaller in size than the granules used for the sintered base to permit penetration. A penetration of at least 25% of the thickness of the layer and preferably at least 75% into the sintered granules is required.

The resin particles used in the dry blend can be a polymer of vinyl chloride or another thermoplastic resin, or the particles can be formed from a thermosetting or rubber elastomeric resin such as disclosed in the above discussion of the coating composition. The particular resin chosen for use in the printing composition should be compatable with the resin used for the sintered base. Resinous compositions of many different colors can be used to form a single, multicolored dry blend. At least two different individually colored dry blends should be used for each dry blend mixture for good results.

As mentioned earlier, the dry blend is mixed with plastisol to form the printing composition. A plastisol has a thermoplastic resin in the form of fine particles thoroughly and uniformly dispersed in a mass of fluid plasticizers. Resins adaptable for use in formulating vinyl plastisols are commonly referred to as dispersion grade resins. Such resins are available having particle sizes of from about 0.02 to about 2 microns in contrast to calender grade vinyl resins which are available in particle sizes ranging up to 200 microns. Dispersion grade resins are usually of higher molecular weight than calender grade resins and have particle surfaces of a hard, horny nature. Polymers of vinyl chloride having specific viscosities above about 0.25 and preferably between 0.30 and 0.70 as measured in a solution of 0.4 gram of resin in 100 milliliters of nitrobenzene at 30° C. are particularly effective. (ASTM D1243-60.)

The selection of the plasticizer is important in determining the strength and flexibility of the product and also in influencing the viscosity and viscosity stability of the printing composition. Suitable plasticizers are among those listed in the description of the coating composition. The plasticizer used should have a low vapor pressure at the temperatures required to fuse the resin. A vapor pressure of 2 millimeters of mercury or loss at 400° F. has been found particularly satisfactory. The fluidity of plastisols is influenced in part by the particular resin and plasticizers selected, but is also a function of the ratio of plasticizer to resin. Plastisols become less fluid as the ratio of plasticizer to resin is reduced. Plastisols for use in the printing composition preferably contain from about 25 to about 100 parts plasticizer per 100 parts resin with a range of about 40 to about 60 parts plasticizer per 100 parts resin being particularly effective. The viscosity of plastisol compositions can also be reduced by addition of small amounts of a volatile diluent not exceeding about 10 parts per 100 parts resin; it being required that the diluent have no solvating effect on the resin. Useful diluents include benzene, toluene, methyl ethyl ketone, petroleum solvents such as V.M. and P. naphtha (boiling range of 190°-275° F.) and the like.

Minor amounts of stabilizers which are incorporated to reduce the effects of degradation by light and heat are present in the composition. Suitable stabilizers include those listed above for use in the coating composition. Normally, the printing composition contains from about 0.5 to about 5 parts stabilizer per 100 parts resin. The particular stabilizers chosen should not impart excessive viscosity to the compositions.

Differently multi-colored printing compositions can be applied to different areas of the sintered granules as desired. The printed sheet is consolidated into a nonporous layer by the application of heat from an oven or a bank of infra-red heat lamps. Those skilled in the art of processing resins would be able to select the proper temperatures required to yield a smooth, tough and durable product depending on the resin selected. When utilizing the preferred vinyl chloride polymer, it is usually necessary to heat the composition to about 300° F. to about 375° F. to cause the granules to be sintered together and higher during the final consolidation to cause complete solvation of the resin with plasticizer and fusion of the composition into a solid non-porous mass.

A product having a greater textured appearance can be produced by incorporating a blowing agent in the printing composition which will decompose on the application of heat to form a cellular composition. Any of the blowing agents commonly utilized in resinous compositions are suitable such as p,p'-oxybis (benzene sulfonyl hydrazide); p,p'-oxybis (benzene sulfonyl semicarbazide); 2,2'-azobisisobutyronitrile; N,N'-dimethyl-N,N'-dinitrosoterephthalamide; diazoaminobenzene and 1,1'-azobisformamide. This latter blowing agent is particularly useful since it decomposes at a temperature above the fusion temperature of most resinous compositions. This will allow the composition to be fused and then, on heating to a higher temperature, the blowing agent will decompose. As an illustration, about one to five parts of 1,1'-azobisformamide is added to each hundred parts of printing composition with about one part of dibasic lead phosphite as an accelerator for the blowing agent. Upon heating the printing composition, after fusion of the sintered granules, to about 350° to 400° F., the blowing agent will decompose to form a cellular structure which will cause the printed areas to be additionally raised.

Products produced in accordance with the invention have a hard and durable wearing surface intimately and firmly bonded to the backing web. The decorative wearing surface can have a multi-colored geometric-type design which either extends completely through the wear layer of the product or extends for a substantial distance into the wear layer of the product.

The following examples are given for purposes of illustration:

EXAMPLE I

A coating emulsion having the following composition is prepared:

| | Parts (dry) |
|---|---|
| Vinyl chloride polymer latex (50% solids) | 30 |
| Butadiene-acrylonitrile copolymer (50% solids) | 20 |
| Titanium dioxide dispersion (60% solids) | 14 |
| Calcium carbonate dispersion (60% solids) | 54 |
| Sodium alkyl aryl sulfonate | 2 |
| Methyl cellulose suspension (7% solids) | 15 |
| Water. | |

A beater-saturated sheet of rubber and asbestos of approximately 0.037 inch thickness is coated on one surface with the coating emulsion by means of a reverse roll coater. The coating which is about 0.003 inch in thickness is then dried by exposure to a temperature of about 300° F. for five minutes.

Granules were prepared by mixing the following components together at a temperature of 200° F.:

| | Parts |
|---|---|
| Vinyl chloride homopolymer (calender grade) | 100 |
| Dioctyl phthalate | 30 |
| Stabilizer | 3 |
| Epoxidized oil | 5 |

The granules are passed through a 40 mesh screen (0.015 by 0.015 inch openings). The granules were then distributed on the coated asbestos sheet to form a uniform layer of 0.04 inch in thickness. The layer was then heated for four minutes in an oven heated to 300° F. The granules, during this heating, were sintered into a uniform porous mass.

The printing composition had the following composition:

| | Parts |
|---|---|
| Dry Blend: | |
| Vinyl chloride polymer (calender grade) | 100 |
| Plasticizer (Dioctyl phthalate) | 33 |
| Stabilizer | 2 |
| Epoxidized oil | 5 |
| Dry-up resin (dispersion grade) | 4 |
| Plastisol: | |
| Vinyl chloride copolymer (dispersion grade) | 100 |
| Plasticizer (Dioctyl phthalate) | 52 |
| Stabilizer | 7 |
| Pigment | 12 |

The dry blend and plastisol were thoroughly mixed to form the printing composition. Four such mixtures were made, each with a different combination of colored granules. A design was printed on the sintered sheet using a number 40 mesh silk screen. Four separate screens were used, one for each printing composition. The printed sintered sheet was then passed into an oven at 385° F. for 3.5 minutes. The resulting sheet had a wear layer thickness of about 0.05 inch. The printed design extended completely through the wear layer of the product and was raised about 0.020 inch above the unprinted area.

EXAMPLE II

The procedure of Example I was followed except that three parts of azodicarbonamide (1,1′-azobisformamide) as a blowing agent and 0.5 part of dibasic lead phosphite were added to the printing composition. The final product was heated to 400° F. to decompose the blowing agent. The resulting sheet was identical to Example 1 except that the printed areas were raised about 0.035 inch above the surface of the sheet.

EXAMPLE III

The procedure of Example I was followed except that 20% by weight of sodium chloride was admixed with the granules and the layer of granules applied was about 0.05 inch in thickness. After sintering the sheet, it was washed with water to remove the sodium chloride. The sintered sheet was then dried prior to printing. The sintered sheet was printed in a mosaic pattern with no printing composition being applied to the mortar line areas. The printed sheet was then heated to 375° F. for 3.5 minutes. The mortar line area in the finished product was depressed about 0.030 inch below the surface of the product.

EXAMPLE IV

The procedure of Example 1 was followed, except that 10% by weight of ammonium carbonate was admixed with the granules. The mixture was distributed on the coated felt to form a layer 0.050 inch in thickness. The sheet was then sintered for six minutes at 350° F. After cooling, the sheet was printed in a manner described in Example III. The final sheet had a printed decoration extending through its entire thickness and a mortar line of about 0.028 inch in depth on average.

Any departure from the foregoing description which conforms to the invention is intended to be included within the scope of the claims.

What is claimed is:

1. In a process for producing a non-porous decorative surface covering having an inlaid decoration comprising depositing very fine granules of resinous composition in a layer at least 0.015 inch in thickness on the surface of a backing sheet, heating to sinter the granules into a porous mass of uniform porosity without complete coalescence thereof, applying a design on the surface of the sintered layer with sufficient printing composition to permeate into the porous structure to a substantial depth at the points of application and then fusing the printed sintered layer into a non-porous sheet by the application of heat, the improvement which comprises utilizing as said printing composition a uniform mixture of a pigmented dry blend of at least two colorations and a transparent or pigmented plastisol so that the resulting product has transparent areas dispersed throughout the fused multicolored dry blend in the areas of printing composition application.

2. The process of claim 1 wherein sufficient printing composition is applied to said sintered layer to produce a product having a textured surface.

3. The process of claim 1 wherein the porosity of the sintered layer is substantially increased by admixing fine particles of a solvent soluble compound with said granules and thereafter treating said sintered layer with a solvent to remove said soluble compound.

4. The process of claim 1 wherein the porosity of the sintered layer is substantially increased by admixing fine particles of a heat unstable compound with said granules and thereafter heating said mixture to decompose said unstable compound.

5. The process of claim 1 wherein the porosity of the sintered layer is substantially increased by admixing fine particles of a high melting solid plasticizer for said resinous composition with said granules and thereafter heating said mixture to cause the plasticizer to be absorbed by said resinous composition.

6. The process of claim 1 wherein the porosity of the sintered layer is substantially increased by admixing fine particles of a heat-shrinkable composition with said granules and thereafter heating said mixture to cause said heat-shrinkable compound to shrink.

7. The process of claim 1 wherein a blowing agent is added to the printing composition and the non-porous sheet is heated to decompose said blowing agent.

8. The process of claim 1 wherein said granules have a maximum diameter of from about 0.10 to about 0.005 inch.

9. The process of claim 1 wherein said dry blend contains resinous particles having a maximum diameter of from about 0.015 inch to a minimum diameter of about 0.002 inches.

10. The process of claim 1 wherein said plastisol is composed of 100 parts resin with from 40 to 60 parts plasticizer.

* * * * *